No. 630,325. Patented Aug. 8, 1899.
H. W. CHENEY.
BEVEL GEAR GENERATING MACHINE.
(Application filed May 23, 1898.)
(No Model.) 10 Sheets—Sheet 1.

WITNESSES.
INVENTOR.
Herbert W. Cheney
By Newell S. Wright
His Attorney

No. 630,325. Patented Aug. 8, 1899.
H. W. CHENEY.
BEVEL GEAR GENERATING MACHINE.
(Application filed May 23, 1898.)
(No Model.) 10 Sheets—Sheet 2.

WITNESSES. INVENTOR.
Herbert W. Cheney
By Newell S. Wright
His Attorney

No. 630,325. Patented Aug. 8, 1899.
H. W. CHENEY.
BEVEL GEAR GENERATING MACHINE.
(Application filed May 23, 1898.)
(No Model.) 10 Sheets—Sheet 3.
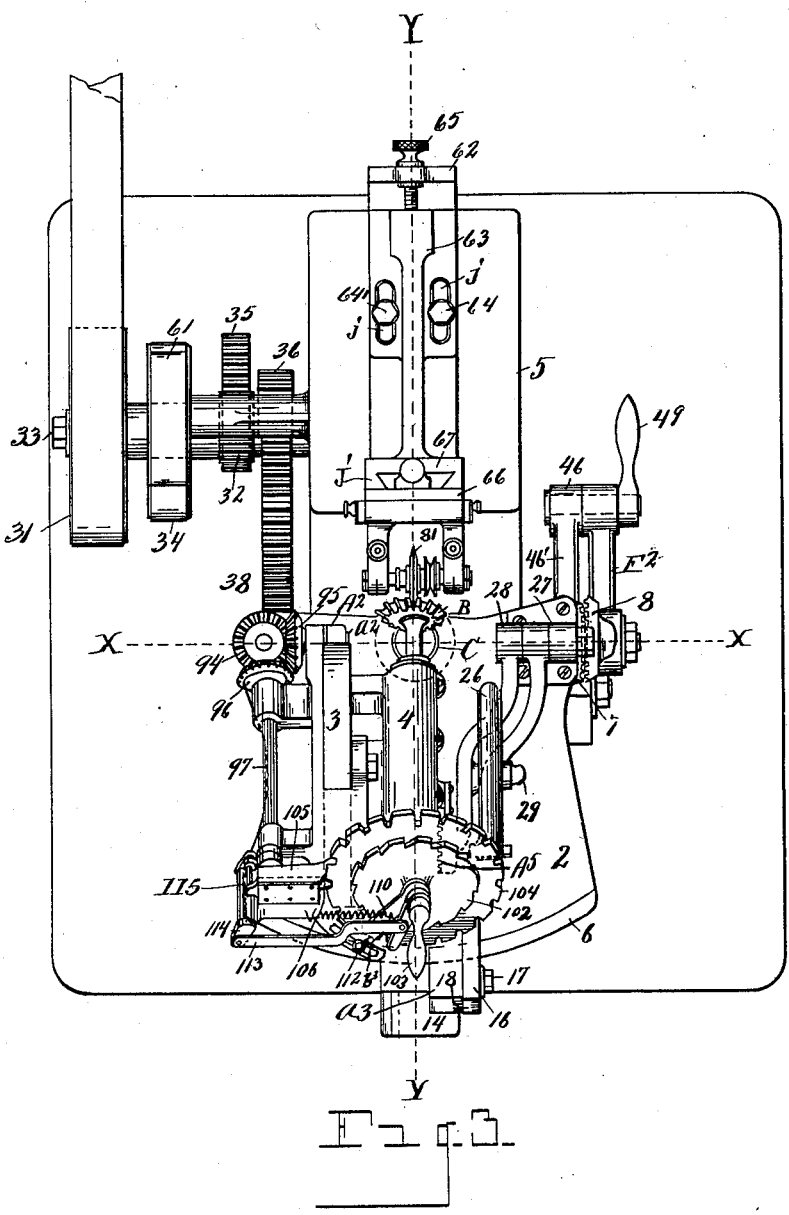
WITNESSES.
INVENTOR.
Herbert W. Cheney
By Newell S. Wright
His Attorney

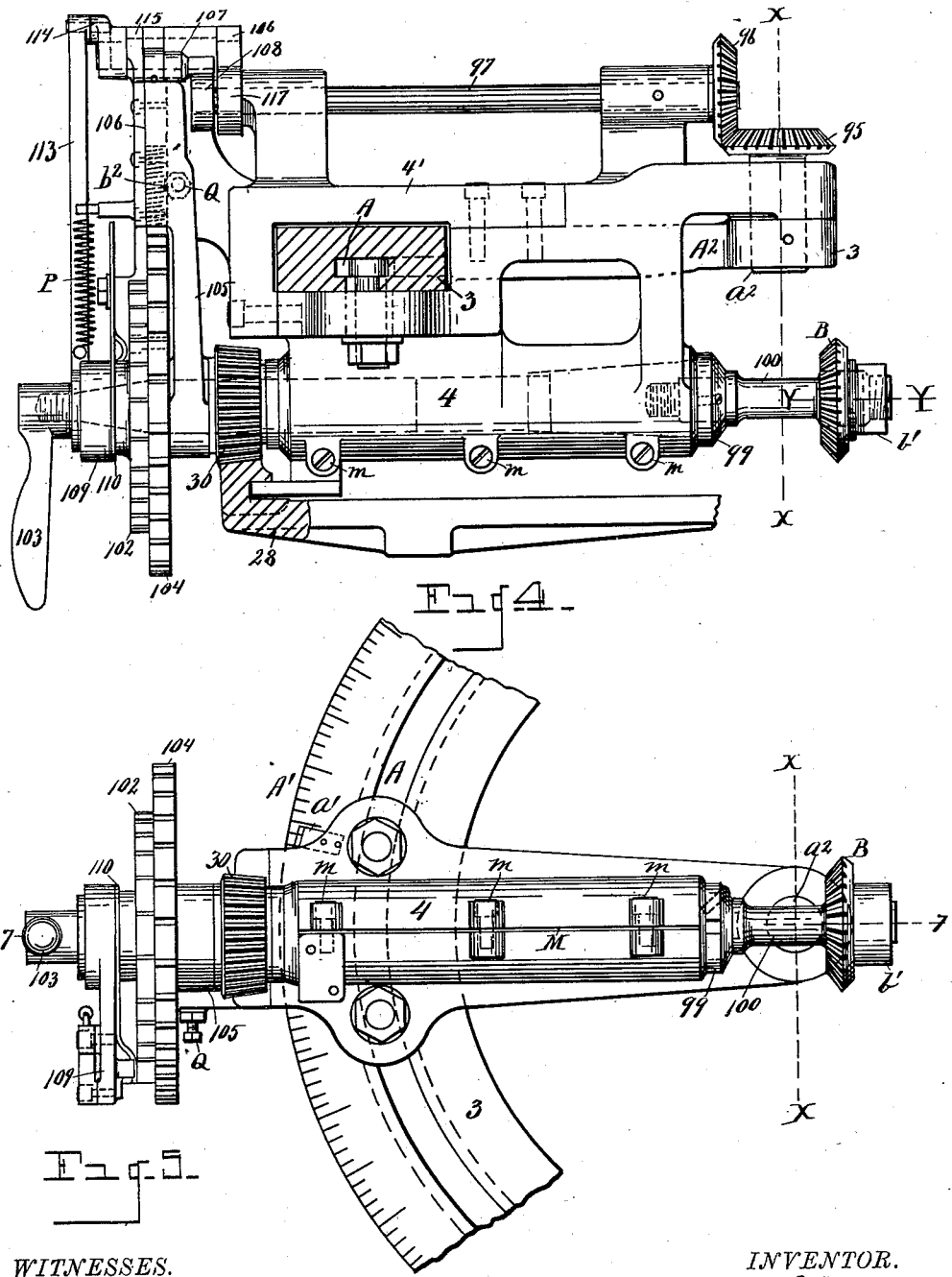

No. 630,325.  
H. W. CHENEY.  
BEVEL GEAR GENERATING MACHINE.  
(Application filed May 23, 1898.)  
(No Model.)  
Patented Aug. 8, 1899.
10 Sheets—Sheet 5.
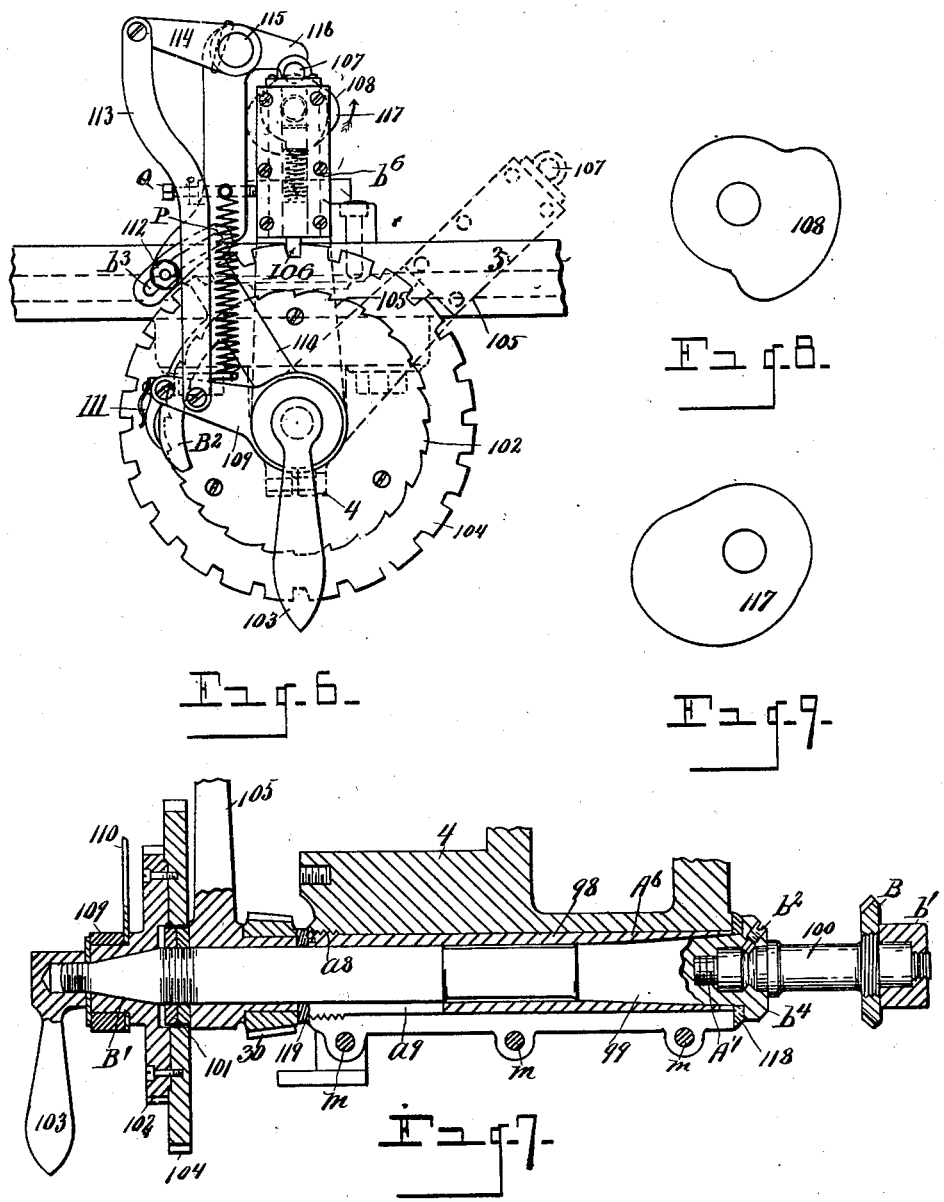
WITNESSES.
INVENTOR.  
Herbert W. Cheney  
By Newell S. Wright  
His Attorney

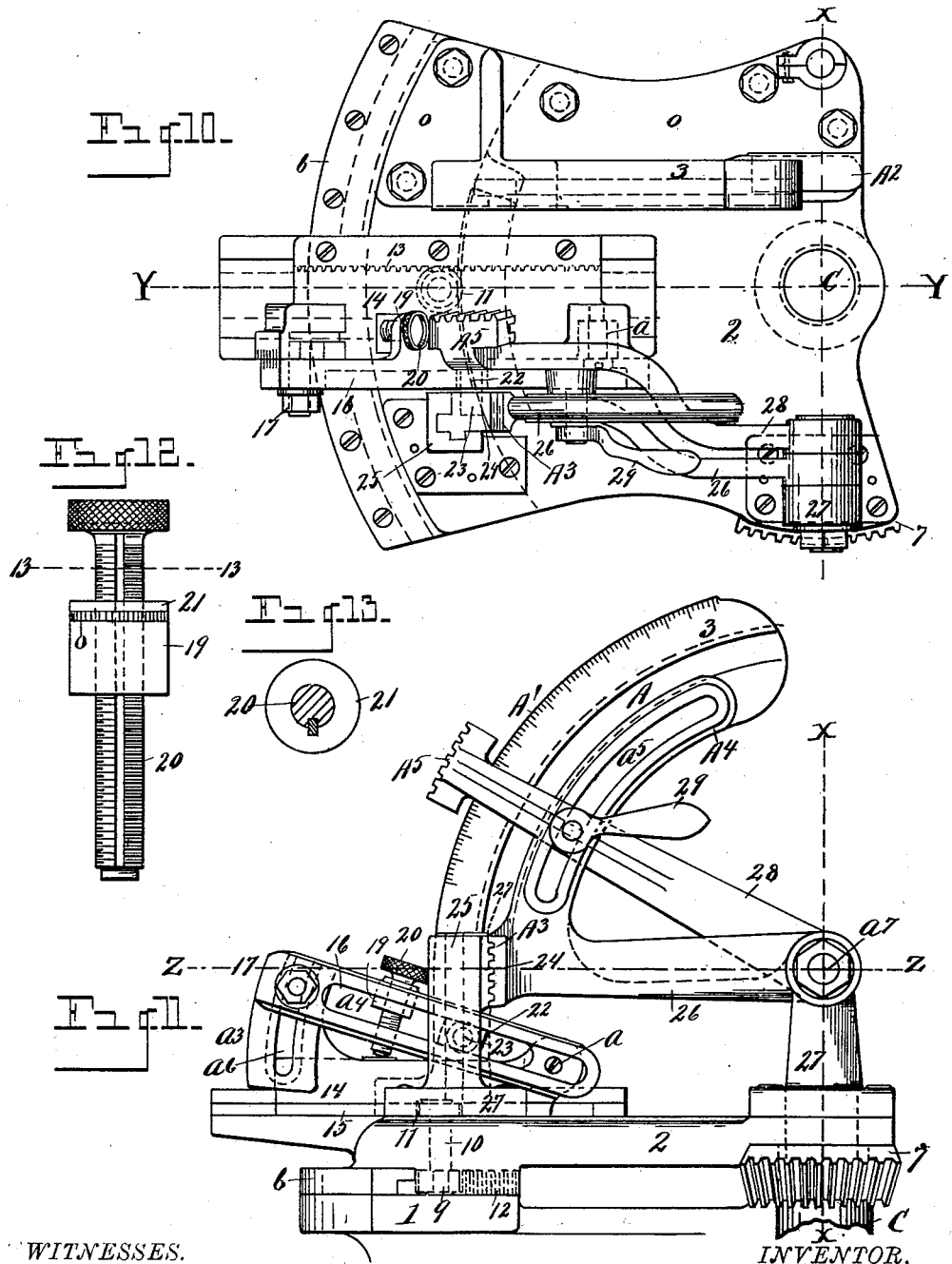

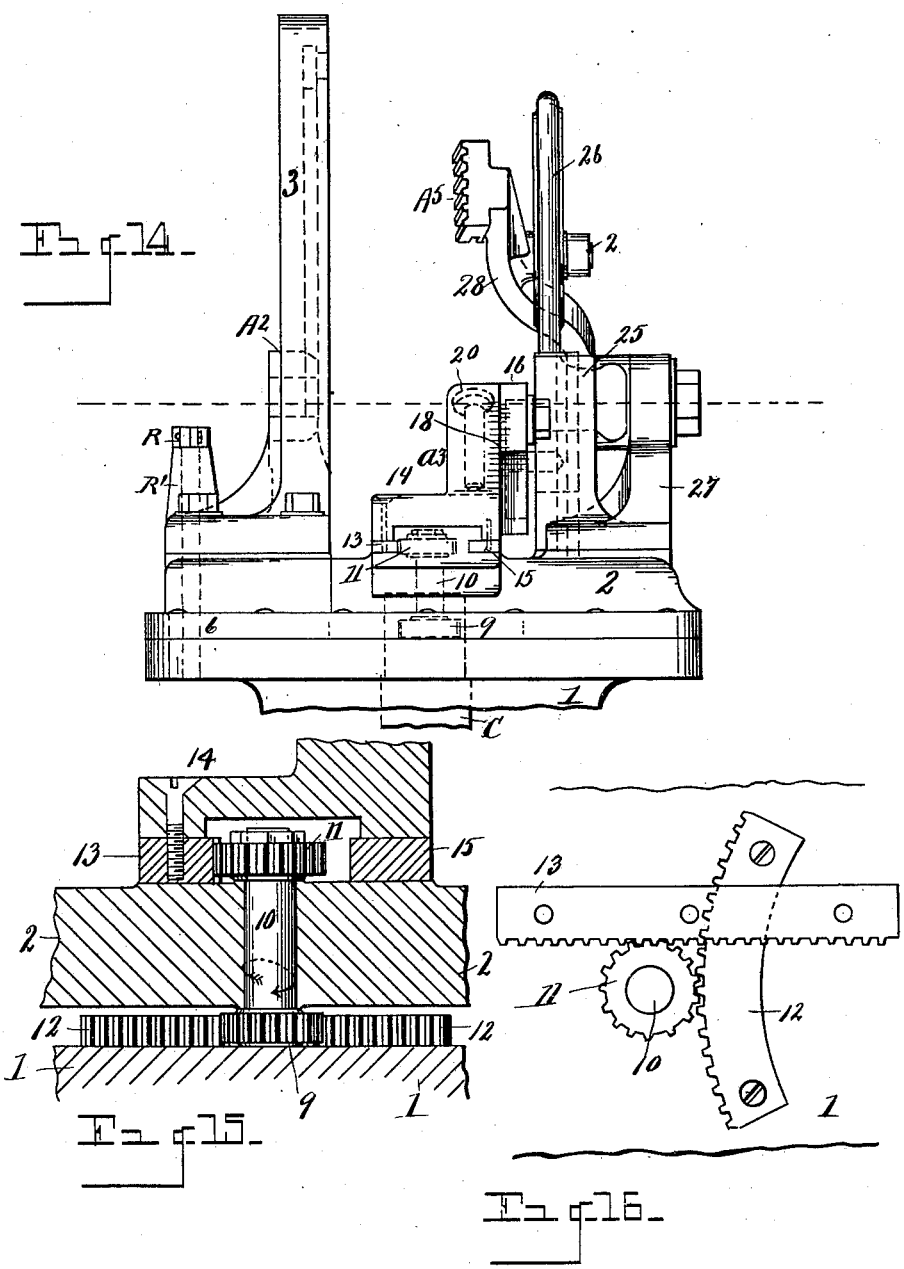

No. 630,325. Patented Aug. 8, 1899.
H. W. CHENEY.
BEVEL GEAR GENERATING MACHINE.
(Application filed May 23, 1898.)
(No Model.) 10 Sheets—Sheet 8.
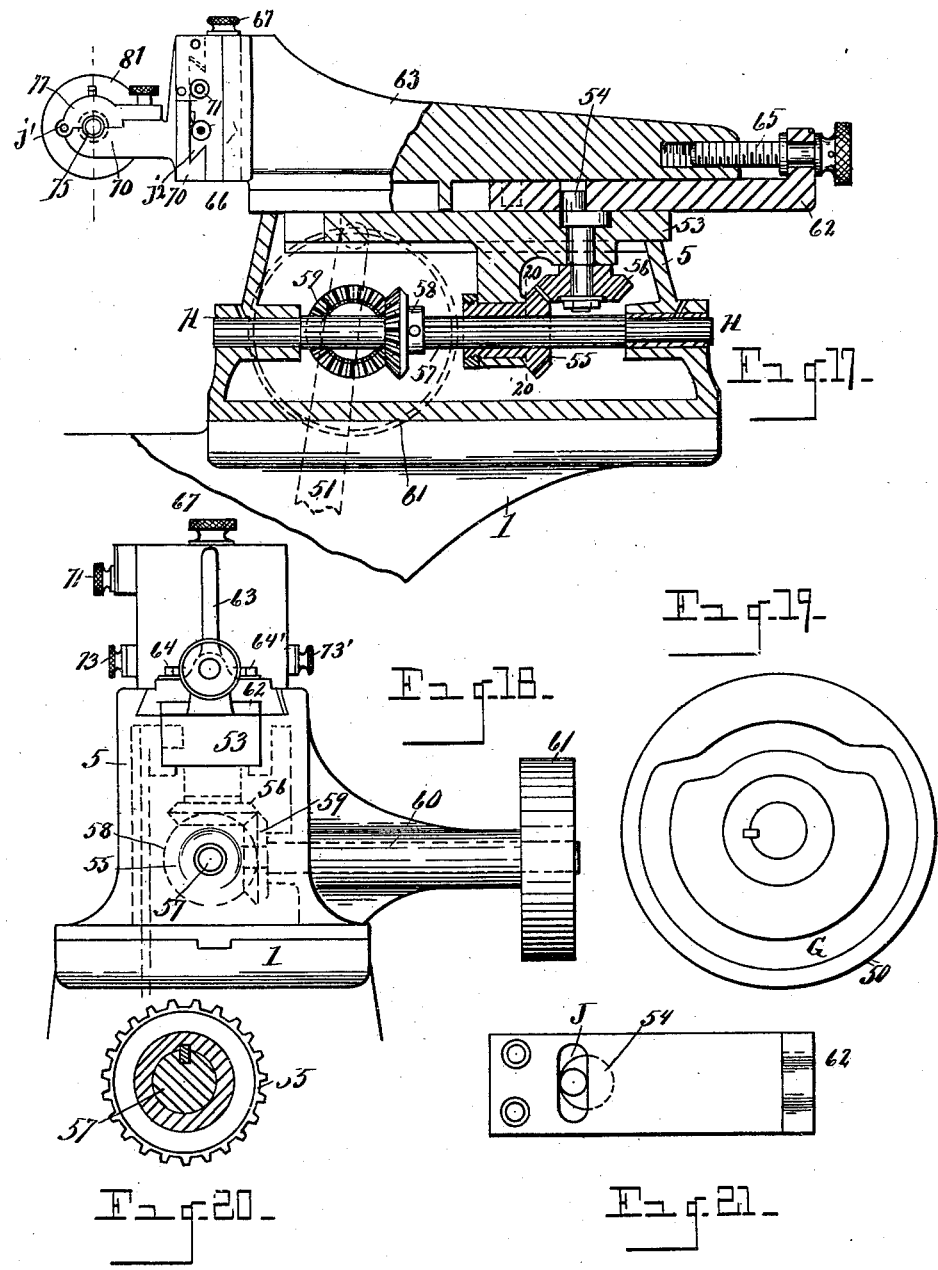
WITNESSES.
INVENTOR.
Herbert W. Cheney
By Newell S. Wright
His Attorney

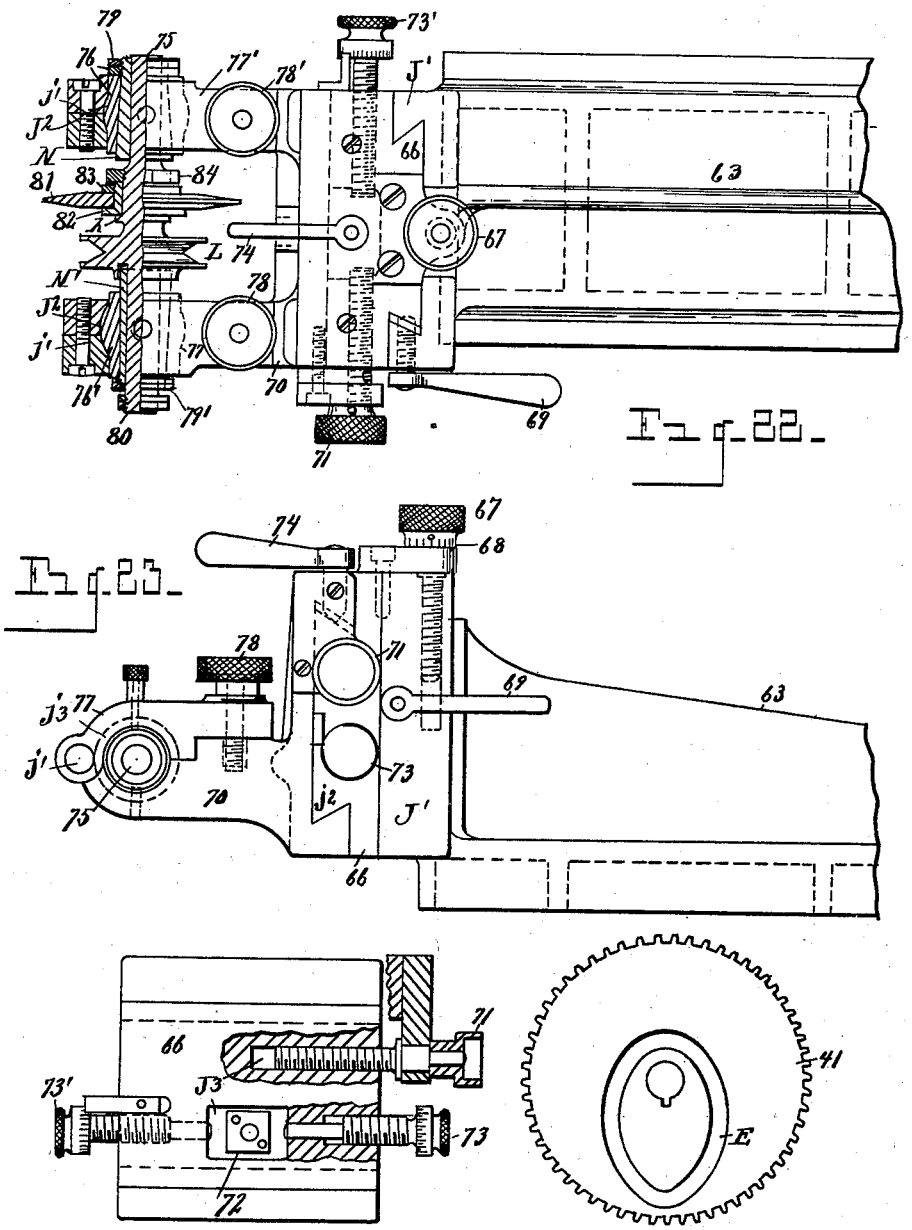

No. 630,325. Patented Aug. 8, 1899.
H. W. CHENEY.
BEVEL GEAR GENERATING MACHINE.
(Application filed May 23, 1898.)
(No Model.) 10 Sheets—Sheet 10.
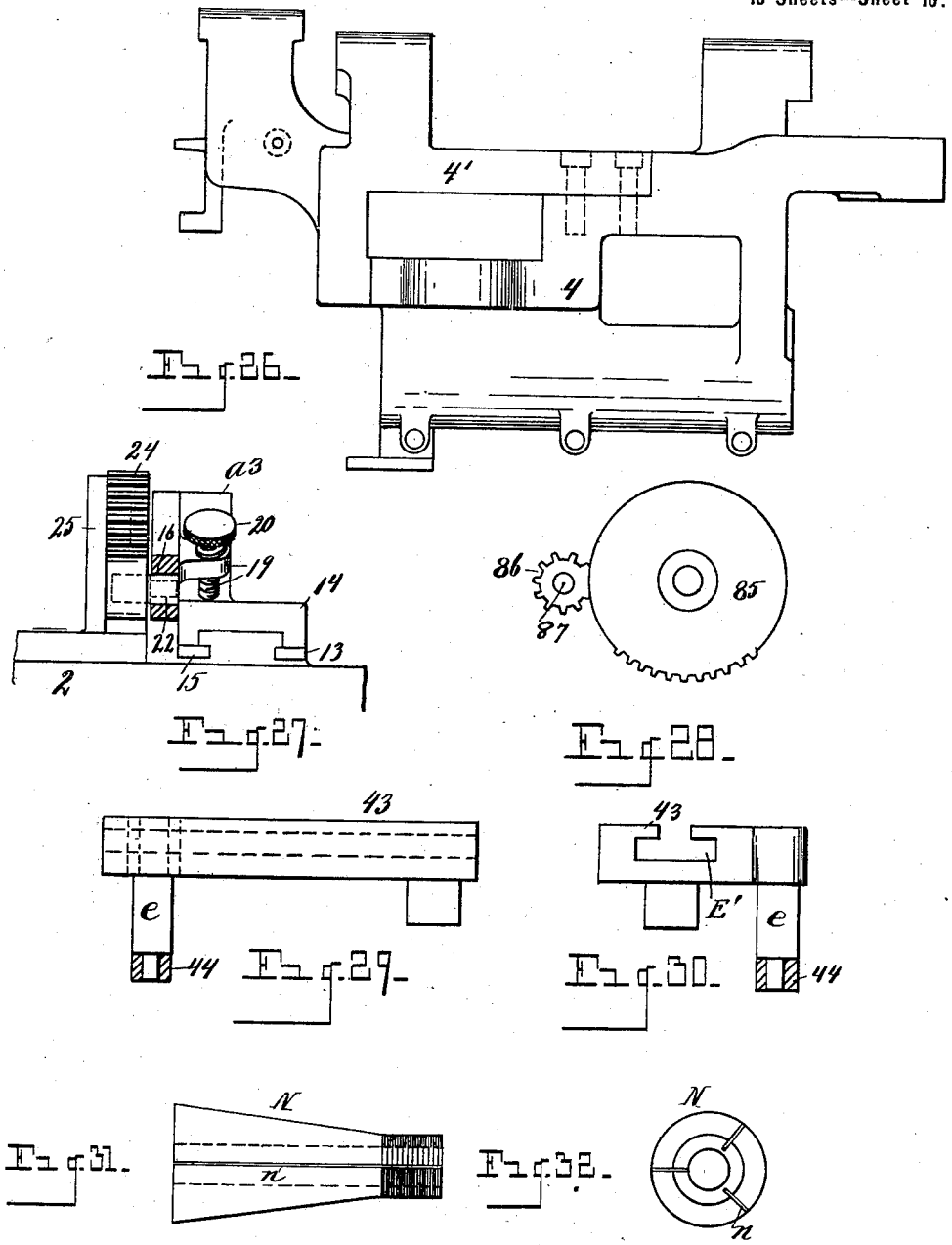
WITNESSES. 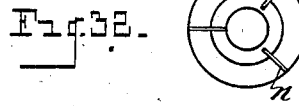 INVENTOR.
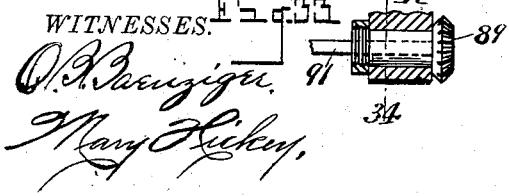 
*His* Attorney

UNITED STATES PATENT OFFICE.

HERBERT W. CHENEY, OF DETROIT, MICHIGAN, ASSIGNOR TO THE LELAND & FAULCONER MANUFACTURING COMPANY, OF SAME PLACE.

BEVEL-GEAR-GENERATING MACHINE.

SPECIFICATION forming part of Letters Patent No. 630,325, dated August 8, 1899.

Application filed May 23, 1898. Serial No. 681,521. (No model.)

*To all whom it may concern:*

Be it known that I, HERBERT W. CHENEY, a citizen of the United States, residing at Detroit, county of Wayne, State of Michigan, have invented a certain new and useful Improvement in Bevel-Gear-Generating Machines; and I declare the following to be a full, clear, and exact description of the invention, such as will enable others skilled in the art to which it appertains to make and use the same, reference being had to the accompanying drawings, which form a part of this specification.

My invention is designed to provide a novel bevel-gear-generating machine of superior efficiency and utility; and it consists of the construction, combination, and arrangement of devices hereinafter set forth, and illustrated in the accompanying drawings, in which—

Figure 1:
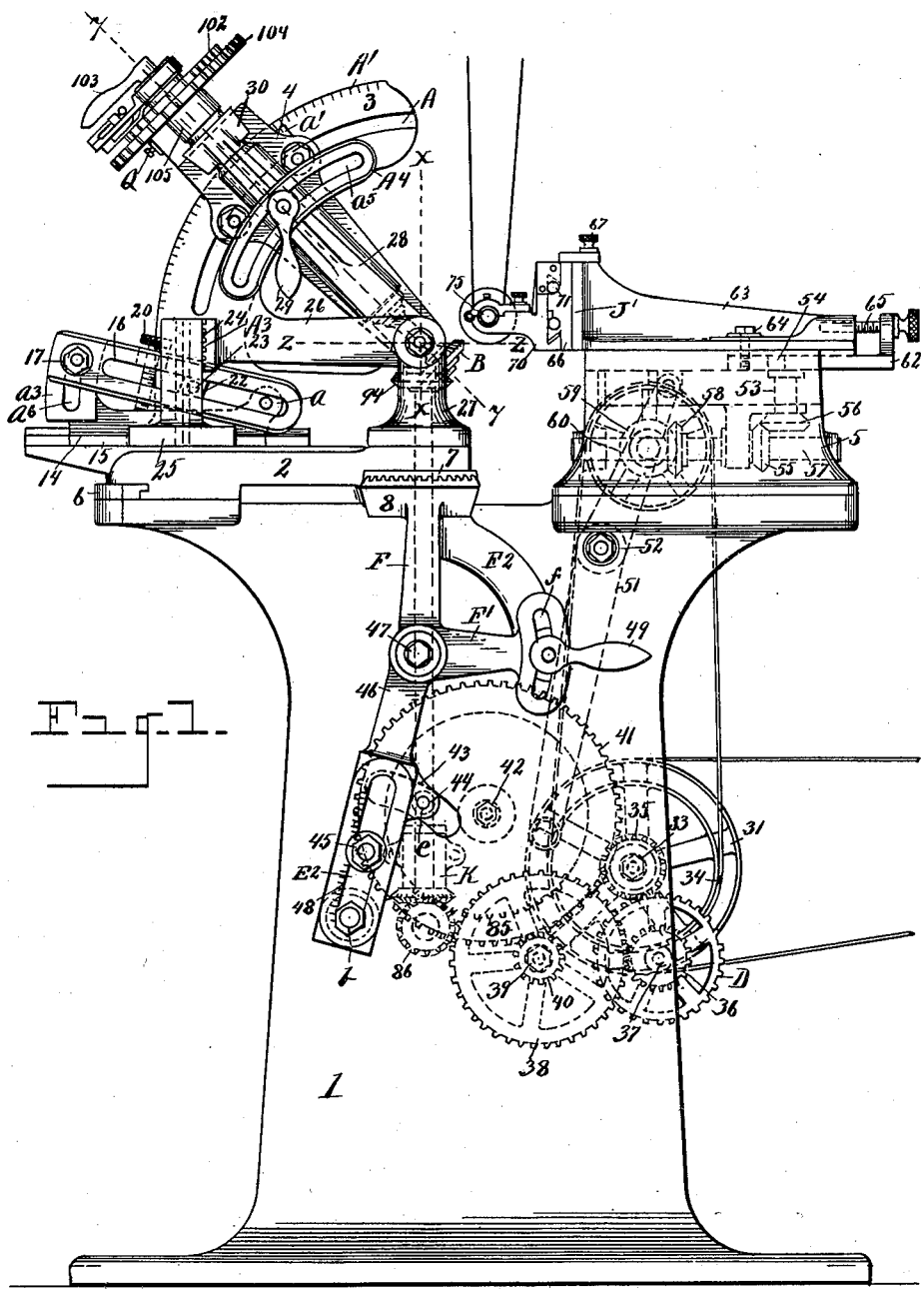
Figure 2:
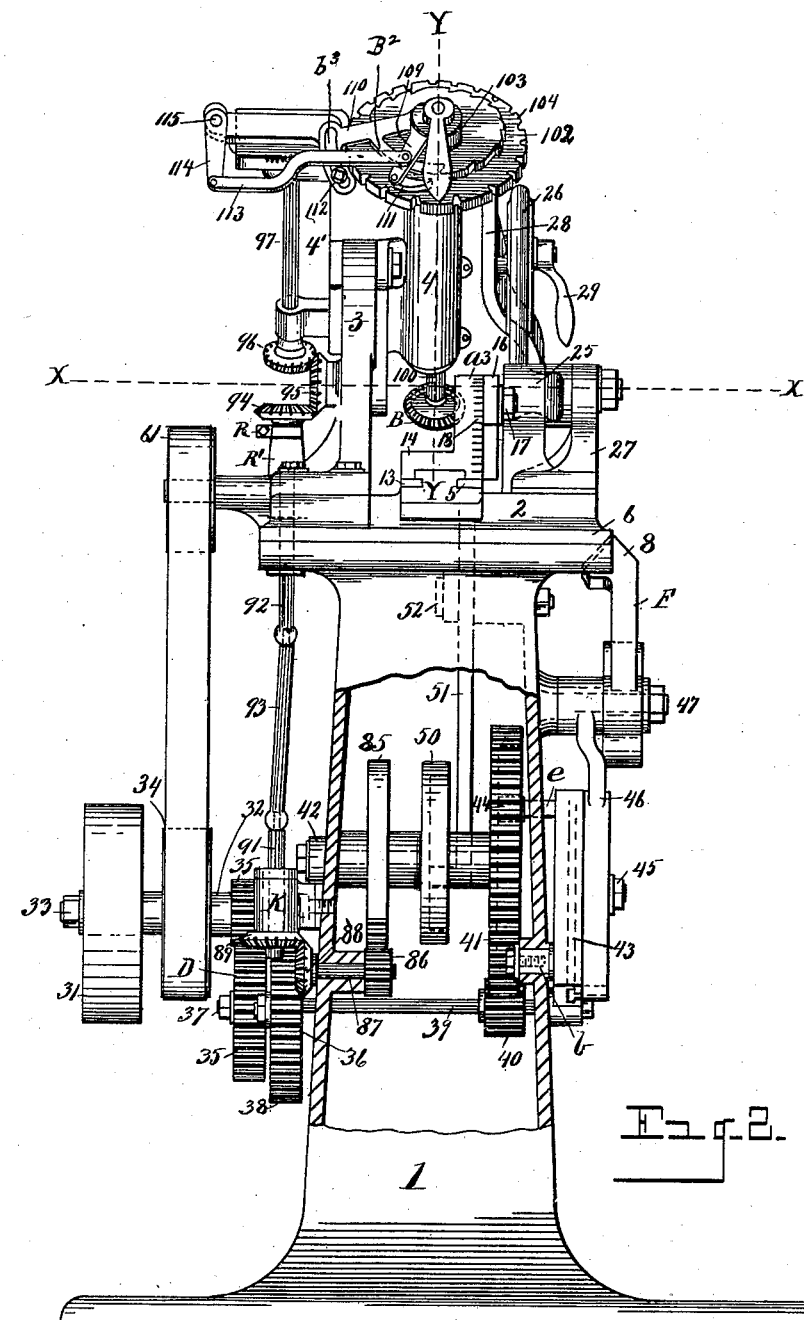

Figure 1 is a side elevation of the machine. Fig. 2 is an end elevation showing a part of the supporting-base broken away to show certain portions of the mechanism therewithin. Fig. 3 is a plan view of the machine. Fig. 4 is a plan view of the spindle-bracket and indexing mechanism, showing the quadrant in section and the bevel-segment in partial section to show the bearing for the same near the teeth. Fig. 5 is a side elevation of the spindle-bracket and indexing mechanism with the bevel-segment omitted. Fig. 6 is a rear end view of certain parts shown in Figs. 4 and 5, showing the indexing-plate and related parts. Fig. 7 is a horizontal longitudinal section of the spindle-bracket and indexing mechanism on the line 7 7, Figs. 1 and 5. Fig. 8 is a detail view of the cam 108, and Fig. 9 is a detail view of the cam 117, which cams are employed for operating the indexing mechanism. Fig. 10 is a plan view of the table, quadrant, and mechanism employed to communicate rotary motion to the gear to be generated. Fig. 11 is a side elevation of mechanism embodied in Fig. 10, showing the segment-arm 26 and related parts. Fig. 12 is a detail view of the screw and graduated ring used to set the angular slide shown in Fig. 11 to the correct angle. Fig. 13 is a view of the same in section on the line 13 13, Fig. 12. Fig. 14 is an end elevation of certain mechanism embodied in Fig. 10, showing the quadrant 3, the segment-arm 26, bevel segment-arm 28, and related parts. Figs. 15 and 16 are detail views of the gear employed to transmit motion to the slide working upon the table. Fig. 17 is a partial vertical sectional view of the head and mechanism connected therewith which reciprocates the ram carrying the emery-wheel, showing parts in elevation. Fig. 18 is an end elevation of the head and the ram. Fig. 19 is a detail view of the cam which brings the emery-wheel forward to grind the gear and removes it from the gear-blank at the proper time, so that there is no interference while indexing. Fig. 20 is a sectional view of the sliding gear in the head. Fig. 21 is a plan view showing the adjusting-slide and its relation to the eccentric. Fig. 22 is a plan view of a portion of the ram, showing the adjusting-slides for the emery-wheel and a partial section of the bearing for the emery-wheel spindle. Fig. 23 is a side elevation of features shown in Fig. 22. Fig. 24 is a detail view of a portion of the cross-slide for the lateral adjustment of the emery-wheel, showing micrometer-stops for accurate location of the wheel and a traversing-screw for moving the slide. Fig. 25 is a detail view of the combined driving-gear and feed-cam or cam-gear. Fig. 26 is a detail view in plan of the spindle-bracket. Fig. 27 is a view in vertical cross-section on the line 27 27, Fig. 11. Fig. 28 is a detail view of the intermittent gear 85 and pinion. Fig. 29 is a detail view of the arm 43. Fig. 30 is a lower end view of the same. Fig. 31 is a detail view of the box N for the shaft of the grinding-wheel. Fig. 32 is an end view of Fig. 31. Fig. 33 is a detail view in section through the bracket K, showing a portion of the shaft 91. Fig. 34 is a cross-section of the same on the line 34 34, Fig. 33.

My invention is designed to provide a bevel-gear-generating machine in which the movements of the gear-blank and of a rapidly-rotating emery-wheel of special form work in synchronism with each other to produce tooth curves which are theoretically accurate.

My invention relates more particularly to truing bevel-gears after they have been hardened and contemplates the use of an emery-wheel having its peripheral section of the same form as a rack-tooth of given obliquity of angle, which emery-wheel shall be rotated at sufficient speed to give practical results in grinding and which emery-wheel is being also at the same time reciprocated, the position of the emery-wheel being such that one of its cutting-faces or angular faces shall reciprocate in a plane passing through the cone-center of the gear being generated. The emery-wheel must obviously be thin enough to allow it to pass through the narrowest place in the toothed space, only one side of a tooth being ground at a given instant with the one wheel.

The principle upon which my improved machine is to do its work is based upon the fact that if two gears mesh properly with a rack they must mesh properly with each other. It is well understood that the rack for involute spur-gears has teeth whose sides are planes inclined to the pitch-line at an angle equal to the complement of the angle of obliquity or angle of pressure required in the system of gearing to be used with the rack, the line of intersection of said planes being parallel to the center line of the gear.

A rack to correspond with a bevel-gear is in reality a crown-gear or a gear having teeth whose sides are planes inclined to the pitch-line at an angle equal to the complement of the angle of obliquity or angle of pressure required in the system of gearing to be used with the rack; but the line of intersection of said planes passes through a point at the intersection of the center line of the gear and the cone pitch-line of the gear. In other words, the cone center of the crown-gear must coincide with a point in planes, sections of which form either side of the crown-gear tooth.

It will be understood that if a cutting-tool formed like the rack-tooth corresponding to a spur-gear be reciprocated while the spur-gear blank be rolled past the cutting-tool by mechanism which will keep said blank in the same relation with said cutting-tool which it would have when intermeshing with a rack teeth will be generated which will be theoretically correct and have a perfect contact with a corresponding rack-tooth for the full working depth. Likewise if we place such a reciprocating tool in such a position that one of its sides always coincides with the plane of the side of a tooth to any imaginary crown-gear set at the proper depth to intermesh correctly with a bevel-gear and a bevel-gear blank be attached to mechanism which will always keep it in a position to mesh properly with the imaginary crown-gear and which will impart motion to the blank, such as the finished gear would have in rolling in mesh with the stationary crown-gear—viz., a rolling of the gear on its axis combined with a swiveling of the same about its cone-center—then we shall generate the teeth to the bevel-gear which shall be theoretically correct and have a perfect contact with the crown-gear tooth for the full working depth. Therefore my invention contemplates, in conjunction with the emery-wheel above-mentioned, the provision of mechanism which will impart a motion to the gear to be generated which is identical with the motion which it would have when rolled upon a corresponding rack or a crown-gear as hereinbefore explained.

It is well understood that steel gears are always liable to become more or less distorted by the hardening process to which they are passed, and as the slightest distortion is liable to render such gears unfit for use on account of the accuracy required in the finished product a large percentage of gears hardened after they are finished must be thrown aside unless means are devised to true them in a perfect and efficient manner after they are hardened.

Some of the objects of my invention are, first, to provide practical and economical means for generating bevel-gear teeth to the theoretical curve required for perfect tooth contact after the gears have been hardened; second, to provide mechanism for accomplishing this work after the gears have been hardened which will be simple, durable, efficient, convenient, and which may be quickly adjusted to suit the various sizes of bevel-gears within the capacity of the machine and have its parts so arranged that the accuracy of the generated tooth will not be seriously affected by backlash in the parts communicating the required motions; third, to provide mechanisms which shall so handle the gear and the emery-wheel of special form that the grinding-contact of the emery-wheel is continuously changing during the grinding of a given tooth, which will insure greater durability of the emery grinding-wheel and lessen the tendency of the same to become untrue; fourth, to provide mechanism which shall be entirely automatic in operation for one complete revolution of the gear-blank being operated upon and which shall be positive; fifth, to provide adjustment, changes of feed, and cutting speeds in relation one to another, so that the most practical results may be obtained; sixth, to afford facilities for the proper adjustment of the machine to generate different sizes and angles of bevel-gears without special forms of attachments thereto for each angle and side; seventh, to reduce the number of adjustable and working parts of the machine to a minimum, thereby reducing the cost of the machine and also preventing the inaccuracies that must creep into the construction of a complicated machine; eighth, my invention also contemplates the general construction, form, and arrangement of the machine.

I accomplish the various objects and purposes of my invention as follows:

The numeral 1 indicates any suitable base or support, which with a head 5 constitute the general framework of the machine. The head carries various operative parts of the machine to actuate the emery-wheel, as hereinafter described. An oscillatory table 2 is swiveled to or pivotally supported upon the base, as indicated at C, Fig. 10. The oscillatory table carries various operative parts of the machine to actuate the gear to be generated.

I will first proceed to describe the oscillatory table and the parts carried thereby to actuate the gear to be operated upon by the emery-wheel. Said table 2 is gibbed at its outer edge by a gib 6, secured upon the base 1. The oscillatory movement of the table about its center or pivot C may be imparted thereto in any suitable manner, as by a pair of miter-gear segments (indicated at 7 and 8) in a manner to be hereinafter set forth. The table 2 is provided with a quadrant 3, securely fastened thereto in such a position that its center is in a plane passing through the center of the pivot C of the table. This quadrant 3 has a slot A concentric with the center of the quadrant. A spindle-bracket 4 is employed, provided with a spindle 99, with which spindle is engaged a gear-arbor 100, upon which a gear B to be cut is mounted. The slot A is preferably made T-shaped in cross-section, as shown in Fig. 4, whereby the spindle-bracket 4 may be securely bolted to the quadrant 3 at any desired angle to a plane passing through the center of oscillation of the table, which angle may be indicated by graduations upon the quadrant (indicated at A') and by a pointer $a'$ upon the spindle-bracket, the bracket 4 being adjustable to any desired angle for different sizes of teeth to be generated on different gears. The spindle-bracket 4 is also swiveled or pivoted to an arm $A^2$ of the quadrant concentric with said quadrant, as shown in Figs. 4 and 5 at $a^2$. The oscillatory table carries a bearing, as shown in Fig. 14, in which a shaft 10 rotates, said shaft provided with gears 9 and 11, keyed thereupon. One of said gears, as the gear 9, meshes with the toothed segment 12, rigidly secured to the base 1, while the other gear, as the gear 11, meshes with a rack 13, secured to a slide 14 and which also serves as a gib to the slide 14, as shown in Fig. 14. It will be seen that as the table 2 is oscillated about its center rotation would be given to the gear 9, imparting through the gear 11 a horizontal reciprocatory movement to the rack-gib 13 and the slide 14. By this means the slide 14 is moved toward or from the center of oscillation of the table. The slide 14 is gibbed by gibs 13 and 15 to have a sliding bearing upon the table 2 in a direction toward and from said center. The slide 14 carries an inclined slide 16, which is pivoted to the slide 14, as indicated at $a$, Figs. 1 and 11, for example. The slide 16 may be clamped at any desired angle upon an arm $a^3$ of the slide 14, said arm being constructed with an elongated arc-shaped slot $a^6$ to receive a clamping T-bolt 17, the angle of the slide 16 being indicated by graduations 18 upon the arm $a^3$. The inclined slide 16 is provided with a lug 19, into which is threaded a screw 20, provided with a desired number of threads to the inch—as twenty threads per inch, for example—and arranged so that one turn of said screw will equal one-half degree upon the graduations 18. The screw 20 carries a dial-plate 21 with a desired number of graduations, as indicated in Fig. 12—as thirty graduations, for example—to read minutes of the angle and which turns with the screw of the lug 19 in 20 and rests upon the top of the lug 19 in whatever position the screw may be located. The inclined slide 16 is also provided with a longitudinal slot $a^4$, in which a block 22 has a sliding engagement. In the block 22 is swiveled a stud 23, rigidly secured to a vertical rack-slide 24, having a sliding engagement in a bracket 25, rigidly secured to the oscillatory table. With the rack-slide 24 meshes a toothed segment $A^3$ upon a segment-arm 26, which arm is pivoted upon a bracket 27, secured to the oscillatory table, so that its axis coincides with the center line or axis about which the spindle-bracket 4 oscillates. The segment-arm 26 is provided with a quadrant-arm $A^4$, provided with an arc-shaped slot $a^5$, said quadrant being so arranged that a segment-arm 28, provided with a toothed segment $A^5$, may be rigidly clamped to said quadrant at various desired positions to suit the angle at which the spindle-bracket 4 is set. The quadrant $A^4$ and the segment-arm 28 may be clamped together by a suitable handle-nut 29. The segment-arm 28 is pivoted at the same center as the segment-arm 26, as indicated at $a^7$, Fig. 11, and meshes with a bevel-gear 30 upon the spindle 99 and which controls the rotary motion of said spindle during the grinding of a tooth. It will be seen that during the oscillatory motion of the table 2 its motion will produce a rotary motion of the gear 30 at whatever angle the spindle-bracket 4 may be set, the ratio between the movements being determined by the angle at which the inclined slide 16 is set. I show more particularly in Fig. 7 the spindle-bracket 4 bored to receive the spindle 99 and is provided with a surrounding spindle bushing or bearing 98, said bushing being preferably threaded into said bracket at the rear end thereof, as indicated at $a^8$. The said bushing is also preferably split at its rear end, as indicated at $a^9$. The interior of the bushing is preferably made tapering at its forward end for a portion of its length, as indicated at $A^6$, to receive a correspondingly-shaped portion of the spindle 99. The front end of the spindle is also preferably bored and threaded, as shown at $A^7$, to receive the arbor 100, which carries the gear B. Said gear may be secured upon the arbor in any suitable manner. Thus, for example, said gear may be secured upon the arbor and held in place by a nut $b'$. The arbor may be firmly held in place in the spindle by any suitable means, as by a lock-screw $b^2$, the arbor being made removable and interchangeable. The rear end of the spindle 99 is threaded to receive jam-nuts 101, by which the end thrust of the spindle may be taken up. Upon the spindle 99 is carried an indexing-ratchet wheel 102, the spindle being preferably constructed with a sharp taper (indicated at B') to permit the indexing-ratchet being rigidly secured thereupon in any desired position, as by means of a handle-nut 103. A toothed index-plate 104 is rigidly secured to the indexing-ratchet. The spindle-gear 30 is rigidly secured upon the hub of an index-plunger arm 105, engaged upon the spindle 99, said arm carrying an index-plunger 106, which engages with the notches on the index-plate 104 and having a pin 107, which contacts with an index-plunger cam 108 on an index-shaft 97, said cam being shown in detail in Fig. 8. The index-plunger 106 is carried forward by a spring, (indicated at $b^6$.) On the hub of the index-ratchet 102 is engaged an index-pawl arm 109 and an index-pawl shield 110. (Shown, for example, in Fig. 6.) Pivoted to the index-pawl arm 109 is an index-pawl 111, which engages with the notches of the index-ratchet 102 to index the gear B. The index-pawl shield 110 may be clamped rigidly in various positions to a portion 4' of the spindle-bracket 4, as by a screw 112, said shield being provided with an elongated arc-shaped slot $b^3$, in which said screw may be engaged. The shield is formed with an extension $B^2$, projecting normally under the pawl 111 and serving to keep the index-pawl away from the teeth of the indexing-ratchet when at rest, thus allowing the rolling motion of the gear-spindle 99 while a tooth upon the gear B is being cut. The index-pawl arm 109 is actuated by a link 113, connected with an indexing-lever 114, as shown in Fig. 6, said lever secured to an index rock-shaft 115, having its bearing in a portion of the spindle-bracket 4'. On the opposite end of said rock-shaft is pivoted an index-cam lever 116, which contacts with an index-cam 117 on the index-shaft 97, said cam being shown in detail in Fig. 9. The index-shaft is provided with a gear 96, meshing, as shown in Fig. 4, with an intermediate miter-gear 95, having its center on the center line of the pivoting-point of the bracket 4, carrying the gear-spindle 99. The driving mechanism for operating this gear 95 will be hereinafter explained. The shaft 97 is provided, as already described, with cams 108 and 117 for operating certain portions of the indexing mechanisms. The index-shaft 97 is arranged to make one revolution to index the gear B, and the index-cam 117 and the index-plunger cam 108 are so arranged that as soon as the cam 108 releases the plunger 106 the cam 117 will operate the index-pawl 111 and carry the index-ratchet 102 around one notch. The cam 108 releases the plunger 106 when near the limit of its movement, said plunger dropping into the next notch of the index-plate 104. The plunger-arm 105 must always be in a certain position when the indexing is done, which is at the end of one stroke or movement of the oscillatory table, and then by means of the adjustment upon the segment-arm 26 and bevel segment-arm 28 the machine may be set so that the index-plunger arm 105 will always stop at the proper place for the indexing. A hardened-steel washer 118 lies between the spindle-collar $b^4$ and the adjacent end of the spindle-bracket 4. An additional washer 119 is located between the hub of the index-plunger arm 105 and the adjacent end of the spindle-bracket. These features of the machine, hereinbefore described, may be driven in any suitable manner.

As shown in the drawings, the numeral 33 indicates a shaft secured to the base 1 and upon which is a driving-pulley 31, secured to a sleeve 32, said sleeve being provided with a pinion 35. The pulley 31 runs freely upon the shaft 33, and the gear 35 is arranged to mesh with an intermediate gear D, the hub of which is provided with a small change-gear 36, which is mounted and which runs upon a stud 37, fastened to the base 1. The gear 36 meshes with a large change-gear 38, keyed to a driving-shaft 39, having its bearings in the base 1. The shaft 39 is provided with a driving-gear 40, keyed thereto inside the base, said gear 40 meshing with a toothed cam-gear 41, (shown in detail in Fig. 25,) said cam-gear being mounted upon a cam-shaft 42, having its bearings in the base, said cam-gear having an irregular slot, (indicated at E, Fig. 25,) concentric for about one-quarter of its revolution and which controls the feed mechanism, as hereinafter described. An arm 43 is pivoted to the base, as indicated at $b$, Fig. 2, and has a lug, (indicated at $e$,) carrying a feed cam-roll 44, which extends through an opening in the base and engages with the slot E in the cam-gear 41, which gives to the slotted arm 43 a rocking motion on its pivot $b$. The arm 43 is constructed with an elongated slot E', preferably T-shaped in cross-section, and a T-bolt 45 may be rigidly clamped in said slot at varying distances from the center or pivot $b$. A feed-lever 46 is fulcrumed on a stud 47, secured to the base, and has an elongated slot $E^2$ to engage with the T-bolt 45, said lever communicating motion to an arm F, carrying the miter-gear segment 8, the motion thus communicated being in proportion to the distance said T-bolt 45 is set from the pivot $b$, the feed-lever being provided with graduations (indicated at 48, Fig. 1) to facilitate the accurate adjustment of said lever for any desired amount of feed.

The miter-segment 8, which meshes with the miter-segment 7, as already observed, to impart oscillatory movement to the table 2, is provided with an arm F, pivoted to the stud 47, and is clamped against the feed-lever 46 by a handle-nut 49. Said arm is also provided with a slot $f$, so arranged as to permit the oscillatory table 2 to be moved to any desired position independent of the driving mechanism and permitting the proper adjustment to the machine in setting it up to grind a gear.

The grinding mechanism supported upon the head 5 is constructed as follows: The grinding-wheel 81 has a rotary and a reciprocatory movement on the cone-line of the gear. A reciprocatory ram 63 is employed to carry the grinding-wheel 81, said grinding-wheel being constructed as already mentioned, having its peripheral section of the same form as a rack-tooth of desired obliquity of angle to mesh with a perfected bevel-gear. The grinding-wheel is mounted upon a spindle 75. The ram 63 is carried by a ram-adjusting slide 62, upon which it is made adjustable, as by an adjusting-screw 65. The ram-adjusting slide 62 is carried upon a sliding block 53. This block is provided with two bearings, as shown in Fig. 17, one for the shaft of an eccentric 54 and the other for the shaft of a miter-gear 55, sleeved upon a shaft 57, having its bearings in the head 5, as shown at H H'. The miter-gear 55 meshes with a miter-gear 56 upon the shaft of the eccentric 54. The miter-gear 55 has its bearings in the sliding block 53 and is splined upon the shaft 57 to travel freely upon said shaft, so as to travel with the sliding block 53. The slide 62 is provided with a slot J, (shown in detail in Fig. 21,) in which the eccentric 54 is engaged. The slide 62 may also be rigidly clamped to the ram 63 in various positions to suit the lengths of cone pitch-lines on the gears to be ground, as by screws 64 and 64', said ram being provided with elongated slots j, through which said screws are passed, as shown in Fig. 3. The inner end of the ram is provided with a vertical sliding bearing (indicated at J') to receive and hold a cross-slide block 66, which may be vertically adjusted in said bearing by means of an adjusting-screw 67, having graduations 68, preferably arranged to indicate the thousandth-of-an-inch movement, and which may be rigidly clamped to the ram by a gib-screw and handle 69. The sliding block 66 is constructed with a horizontal bearing $j^2$ for a cross-slide 70 and provided with bearings for the grinding-wheel spindle 75. The slide 70 may be adjusted laterally by means of a traversing screw 71 and has a stop-block 72, as shown in Fig. 24, rigidly secured thereto and projecting into a recess $J^3$ in the block 66, said block provided with micrometer stop-screws 73 and 73', having graduations reading, preferably, to half-thousandths of an inch in such a position that the stop-block 72 will bring up against them to limit the movement of the slide 70 very accurately and so arranged that no dirt can get into it to interfere with its accuracy. The slide 70 may be rigidly clamped in desired position by a gib-screw and handle 74. The slide 70 has two projections, as shown, for the bearings of the grinding-wheel spindle 75, said projections constructed with spherical recesses, as shown at $J^2$, to receive one-half of bearing-boxes 76 and 76', and lugs for bearing-caps 77 and 77', hinged as shown at $j'$. The bearing-caps 77 and 77' have spherical recesses, as shown at $j^5$ in dotted lines, Fig. 23, to match those in the projections of the cross-slide 70 and are rigidly clamped in position by screws 78 and 78'. The bearing-boxes 76 and 76' also have tapering orifices to receive the corresponding bearings N and N', which are threaded, as shown in Fig. 22, for jam-nuts 79 and 79' at one end, by means of which the lateral wear of the parts may be taken up. The grinding-wheel spindle 75 may also be adjusted for end play by means of jam-nuts 80, threaded thereupon, as shown in Fig. 22. The grinding-wheel is shown secured to a flanged collar 82 by a nut 83. Said collar is shown rigidly held upon the spindle 75 by a nut 84, said spindle being formed with a shoulder $h$ on the opposite side of the wheel, against which the collar impinges. The sleeve 32, already mentioned, has securely attached to its hub a ram-driving pulley 34, belted with a pulley 61 upon the ram-driving shaft 60, which shaft has its bearings in the head 5. Said shaft is provided with a ram-driving gear 59, meshing with a gear 58 upon the shaft 57. Upon the shaft 42, already described, is secured a ram-controlling cam 50, (shown in detail in Fig. 19,) which has a cam-groove G, which is so shaped as to keep the grinding mechanism in position while a tooth is being ground and to retract the grinding-wheel to avoid interference therewith while the gear is being indexed. This cam 50 operates the lever 51, which lever is fulcrumed on a stud 52, secured to the base 1. Said lever engages a sliding block 53 in the head 5, already described. On the cam-shaft 42 is also located an intermittent gear 85, keyed thereupon in a suitable relation to cams 41 and 50 and which engages with an intermittent pinion 86. Said intermittent gear and pinion are so arranged that the pinion will cause a step-by-step revolution of the gear 85 upon each rotation of said pinion. The pinion 86 is secured to a shaft 87, having its bearings in the base of the machine, and provided with a miter-gear 88, meshing with a miter sleeve-gear 89, which rotates in a bracket K, secured to the base. Through the sleeve-gear 89 is passed a sliding shaft 91, splined in said gear, which shaft communicates motion to a table indexing-shaft 92 through a universal joint 93. The table indexing-shaft 92 has a bearing in the oscillatory table 2 and is provided with a miter-gear 94, keyed thereupon. The gear 94 meshes with an intermediate miter-gear 95, having its center on the center line of the pivoting-point of the spindle-bracket 4. The gear 95 meshes with the indexing-gear 94 upon the shaft 97, as above mentioned.

The cone-center of the gear to be generated is indicated at the intersection of the dotted lines X X and Y Y, Figs. 2, 3, and 10, the dotted line Y Y passing through a cone-line of the gear.

It will be understood that the gears are formed approximately correct in the customary manner in soft metal and then hardened, after which they are finished by the novel mechanism herein described.

The spindle-bracket is kerfed at one side, as indicated in Fig. 5, for example, at M, and is provided with bolts or screws (indicated at m) to clamp the bracket upon the spindle-bearing.

The quadrant 3 may be formed with a base bolted to the table, as shown at $A^7$, and the center of said quadrant is in a plane indicated by the dotted line X X, Fig. 3. The quadrant is also secured to the spindle-bracket 4 at any desired angle to the plane indicated by said dotted line X X. The bracket 4 is adjustable to any desired angle to the horizontal plane indicated by the dotted line Z Z, said bracket being set at different angles to accommodate different sizes of gears, inasmuch as the pitch angle of different gears must be set with reference to the grinding-wheel as required, as the pitch angle of various gears will of course vary with different sizes. This angle is changed by raising or lowering the end of the bracket opposite the emery-wheel in the manner hereinbefore set forth.

The axis of the arm 26 coincides with the center line about which the spindle-bracket 4 oscillates and is centered at the intersection of the planes X X and Z Z.

The front end of the spindle-bracket swivels on the axis, cutting through the cone-center of the gear.

It will be understood that the index-plate is toothed accurately upon its periphery to correspond with gears having the same number of teeth or multiples thereof, said index-plate being interchangeable.

Since the table 2 oscillates and carries the bearing for the shaft 92, the universal joint 93 is required.

It will be observed that the gear to be cut must have an oscillatory movement about its cone-center similar to the action of a conical pendulum while being ground, the axis of oscillation being on the same vertical plane, while it has also a synchronous rolling movement.

In adjusting the spindle-bracket to different angles, furthermore, the ratio between the oscillatory and rolling movements of the gear must also be changed.

The operation of the mechanism hereinbefore described is as follows: The oscillatory movement is effected by the oscillation of the table by means of the driving-gear actuating the miter-gears 7 and 8. The rolling movement of the gear is secured by means of the bevel-gear 30, actuated by the segment $A^5$ on the bevel segment-arm 28. The angle of the spindle carrying the gear is adjusted by means of the engagement of the spindle-bracket with the quadrant 3. The ratio between the oscillatory and rolling movements of the gear is governed by the inclined slide 16, carried by the slide 14, in the manner hereinbefore set forth. The gear is given also a step-by-step movement to index it in order to grind successive teeth, which step-by-step movement is given by means of the indexing wheel or plate and its pawl 111, said wheel being actuated through the instrumentality of the cam 117 on the feed-shaft 97. Special arbors 100 are provided for different sizes of gears, so as to bring the cone-center always at the same point, or other means may be employed for setting various sizes of gears to the same cone-center.

The grinding-wheel, as already observed, must have a rotatable movement in operation and also a reciprocatory movement, whereby one of its grinding-wheels will be in a plane passing through the cone-center of the gear to be cut. The grinding-wheel is also vertically and laterally adjustable and has an additional reciprocatory movement to enable the wheel to clear itself from the gear when the gear is to be indexed. The rotatable movement of the grinding-wheel is effected by means of a pulley L upon the shaft of the grinding-wheel, said pulley being driven from any suitable source of power. The reciprocatory movement of the grinding-wheel while in the operation of grinding is effected by means of the movement given to the slide 62 by the eccentric 54, as hereinbefore described. The reciprocatory movement of the wheel to cause it to clear the gear when the gear is to be indexed is effected by the lever 51, engaged with the cam on the cam-shaft 42, said lever actuating the slide 53. The lateral and vertical adjustments of the grinding-wheel will be readily understood from the foregoing description.

In setting the gear to be ground one side of the tooth must be set up to a gage. In order to do this, the spindle must be independent of the indexing mechanism. This may be effected by the loosening of the handle-nut 103, thereby relieving it from the taper on the rear end of the spindle, permitting the gear-blank to be turned to any desired position, after which said nut is clamped again in place before the grinding-wheel proceeds. The cam 117 actuates the index pawl-arm 109 through the lever 116, rock-shaft 115, lever 114, and link 113. A spring P retracts the pawl-arm 109. It will be observed that as the spindle 99 is rotated the plunger-arm 105 is carried therewith and away from the cam 117, as indicated in dotted lines, Fig. 6. This movement of said arm, it will be understood, is occasioned by the oscillation of the table, and when said arm has reached the limit of the oscillation of the table in one direction it will be retracted into position to be operated upon by the cam, a set-screw (shown in Fig. 5 at Q) being employed to limit the backward movement of said arm, so that it will always stop in proper relation to said cam.

The intermediate gear 85 and pinion 86 will of course have to be so timed and work in connection with the corresponding cam in such a manner as to operate the indexing mechanism at proper intervals or at the end of one oscillatory movement of the table.

The taper bearings N N' are split, as shown in Fig. 32 at $n$, to enable the lateral wear of the spindle to be taken up. By the construction hereinbefore described it will be evident that by loosening the screws 78 and 78' the corresponding caps may be swung over upon their hinges, allowing the spherical bearing-boxes and the spindle of the grinding-wheel to be lifted out of the cross-slide 70. By employing these spherical bearing-boxes, located in corresponding recesses in said slide, the spindle will readily find its proper alinement when replaced in said slide, and the end movement in said slide will be taken up by the jam-nut 80. It will be understood that when it is necessary to remove the spindle of the grinding-wheel upon the slide, as the grinding-wheels are made interchangeable for different sizes of gears, this construction enables the spindle to be taken out and replaced in a very simple and convenient manner.

It is evident that the teeth of the gears will have to be ground one side at a time, and as the planes on which the grinding-face of the wheel reciprocates passes through the cone-line of the gear this will necessitate throwing the table to one side or the other of the center line, as to one side the line Y Y, Fig. 2, the position being determined by the particular side of the tooth which is wished to be ground. On this account it will be necessary to oscillate the table about its cone-center C only such an amount as will give the required curve to the side of the tooth, this amount of oscillation varying with different sizes and angles of gears. In order to economize time and to necessitate only the required amount of feed or throw of the table corresponding to the particular gear to be generated, means of adjustment have been provided which will adapt the feed to the required size of the tooth to be ground. The parts to effect this adjustment consist of the arm 43, actuated by the feed-cam 41, which imparts motion to the feed-lever 46, and arm F, carrying the gear 8. The arm F is constructed with an arm F', having the arc-shaped slot $f$ hereinbefore referred to, the outer end of the arm F' being connected with the upper end of the arm F by the connecting-arm F², the parts F F' F² being formed in a single integral piece, to which the feed-lever 46 is to be clamped in various positions by the handle-nut 49. The feed-lever 46 is constructed with a laterally-projecting arm 46'. (Shown in Fig. 3.) The arm 46' of the feed-lever and the arm F' are clamped together by the nut 49. The graduations 48 may read to indicate the amount of angle to which the table 2 is to oscillate about its center C.

The operation of grinding a gear by this machine is as follows: The angle of the pitch-lines of the gear to be generated being given, the spindle 99, carrying the gear, is set to the corresponding graduations indicated by the pointer $a'$ on the quadrant 3. The gear is placed upon an arbor 100, the length of which is such that it will bring the cone-center of the gear at the point of intersection of the planes X X, Z Z, and Y Y. Different arbors, it will be understood, are to be used for different sizes and angles of gears. When a gear has been placed in position on a spindle and the spindle-bracket has been set to the desired angle, reference may be made to an accompanying table prepared for the purpose, which will indicate from previous computation the angle at which the slide 16 must be set in order to establish the ratio necessary between the oscillatory movement and the rolling movement of the gear to be operated upon. The inclined slide 16 may be set at the angle indicated in said table by means of the graduations 18. The said accompanying table may also indicate the amount of oscillatory movement which the table should have in order to generate the gear. When this has been determined, the stud 45 may be set with relation to the graduations 48, so as to give the amount of feed required to the table. The nut 49 may then be clamped rigidly. When the table 2 has been moved to the extreme position at the left, the arm 105 should rest upon the set-screw Q. When in this position, the nut 29 may be clamped rigidly to hold the arms 26 and 28 in place.

It will be understood that the ratchet and index wheels must be interchangeable for different sizes of gears. The ram 63 may also be adjusted to such a position as will give the proper amount of movement by means of the nut 64 and screw 65. The grinding-wheel is also adjusted by means of the micrometer-screws, as above described, so that one of its cutting-faces will reciprocate on a plane passing through the cone-center of the gear. This is done by means of an auxiliary gage. (Not shown.) When this has been done, the handle-nut 103 may be loosened and the spindle 99 may be rolled until the gear is in proper position, which may be determined by a suitable gage, (not shown,) after which the nut 103 is again clamped and the machine is ready for operation.

It will be observed that the shaft 97 is carried by the spindle-bracket 4 and is made oscillatory therewith. When the spindle-bracket is adjusted upon the quadrant 3, it of course carries the gear 96 with it. The gear 95 and the universal joint 93 therebeneath are rigidly held in place by means of the intermittent gear 85 and pinion 86. Therefore the movement of the spindle-bracket about its center will rotate the shaft 97, and means will need to be provided for adjusting the shaft 97 and cams 108 and 117, so that the cams will stand in their proper relation to the index-plunger 106 and lever 116. To permit of this adjustment, the gear 94 may be thrown out of mesh with the gear 95. This may be accomplished by providing the shaft 92 with a removable split collar R, which when removed will permit the gear 94 being dropped down. Said collar is supported upon a bracket R', connected with the quadrant 3.

What I claim as my invention is—

1. In a machine for generating the teeth of bevel-gears, means to carry a bevel-gear, a rotatable grinding-wheel, and means to reciprocate the grinding-wheel in the operation of grinding the gear, said gear having an oscillatory movement about its cone-center, substantially as set forth.

2. In a machine for generating the teeth of bevel-gears, a rotatable grinding-wheel, means to reciprocate the grinding-wheel in the operation of grinding the gear, means to give to the gear an oscillatory movement, and means to give to the gear a synchronous rolling movement about the cone-center of the gear, the axis of oscillation remaining on the same vertical plane, substantially as set forth.

3. In a machine for generating the teeth of bevel-gears, a rotatable grinding-wheel, means to reciprocate the grinding-wheel in the operation of grinding the gear, means to carry a gear to be cut, means to oscillate the gear about its cone-center, means to give to the gear a synchronous rolling movement, and means to give a step-by-step rotatable movement to the gear, substantially as set forth.

4. In a machine for generating the teeth of bevel-gears, means to give to the gear an oscillatory and rolling movement about the cone-center of the gear, a rotatable grinding-wheel, means to reciprocate the grinding-wheel in the operation of grinding the gear, and mechanism to govern the ratio of the oscillatory and rolling movements of the gear, substantially as set forth.

5. In a machine for generating the teeth of bevel-gears, means to give to the gear an oscillatory movement about the cone-center of the gear, means to give to the gear a synchronous rolling movement, a rotatable grinding-wheel, means to reciprocate the grinding-wheel in the operation of grinding the gear, and means to regulate the angle of the pitch-line of the gear, substantially as set forth.

6. In a machine for generating the teeth of bevel-gears, means to give to the gear a rolling movement about the cone-center of the gear, the cone-center of the gear remaining the same, a rotatable grinding-wheel, and means to reciprocate said grinding-wheel in the operation of grinding the gear, substantially as set forth.

7. In a machine for generating the teeth of bevel-gears, an oscillatory table, means mounted thereupon to carry the gear, mechanism to impart a rolling movement to the gear about its cone-center, a rotatable grinding-wheel, means to reciprocate the grinding-wheel on cone-lines of the gear in the operation of grinding the gear, substantially as described.

8. In a machine for generating the teeth of bevel-gears, an oscillatory table, means mounted thereupon to rotate the gear, means to adjust the angle of the cone-line of the gear and to give to the gear a step-by-step movement, a rotatable grinding-wheel, and means to reciprocate the wheel on cone-lines of the gear in the operation of grinding the gear, substantially as described.

9. In a machine for generating the teeth of bevel-gears, an oscillatory table, means to carry the gear, mechanism carried by said table to index said gear, a rotatable grinding-wheel, and means to reciprocate said wheel on cone-lines of the gear in the operation of grinding the gear, substantially as described.

10. In a machine for generating the teeth of bevel-gears, an oscillatory table, means mounted thereupon to carry the gear, mechanism mounted on said table to give a rolling movement to the gear, and mechanism to govern the ratio between the rolling movement of the gear and the oscillatory movement of the table, substantially as described.

11. In a machine for generating the teeth of bevel-gears, means to oscillate the gear and to give a rolling movement to the gear, and a rotatable reciprocatory grinding-wheel, substantially as described.

12. In a machine for generating the teeth of bevel-gears, means to carry a bevel-gear, a rotatable grinding-wheel, means to reciprocate said wheel toward and from said gear in the operation of grinding the gear, additional mechanism to feed said wheel to the work and to retract the wheel from the work, and mechanism to give to said gear a step-by-step movement when the grinding-wheel is moved away therefrom, substantially as described.

13. In a machine for generating the teeth of bevel-gears, a table reciprocatory on a line passing through the cone-center of the gear, means to carry a gear mounted upon said table, a rotatable grinding-wheel, and means to reciprocate said wheel on cone-lines of the gear in the operation of grinding the gear, substantially as described.

14. In a machine for generating the teeth of bevel-gears, the combination of means to carry a bevel-gear, a rotatable grinding-wheel, and means to give to the wheel a series of reciprocatory movements in the operation of grinding the gear, substantially as described.

15. In a machine for generating the teeth of bevel-gears, the combination of means to carry a bevel-gear, a rotatable grinding-wheel, and means to give to the wheel a series of reciprocatory movements in the operation of grinding the gear, said wheel having an additional reciprocatory movement to clear the gear, substantially as described.

16. In a machine for generating the teeth of bevel-gears, the combination of means to carry a gear, and a rotatable grinding-wheel, one of the lateral faces of said wheel made reciprocatory on a plane passing through the cone-center of the gear, substantially as described.

17. In a machine for generating the teeth of bevel gears, means to carry a bevel-gear, mechanism to roll said gear upon its axis, mechanism to oscillate said gear about its cone-center, and means to give to the grinding-wheel a series of reciprocatory movements in the operation of grinding the gear, substantially as described.

18. In a machine for generating the teeth of bevel-gears, the combination of means to carry a bevel-gear, a rotatable grinding-wheel, and means to give to the wheel a series of reciprocatory movements in the operation of grinding the gear, mechanism to adjust said grinding-wheel, and means to adjust the gear, the means to carry the bevel-gear being adjustable for various sizes of bevel-gears, substantially as described.

19. In a machine for generating the teeth of bevel-gears, means to carry a bevel-gear, a rotatable grinding-wheel, means to give a series of reciprocatory movements to said wheel in the operation of grinding the gear, and mechanism to adjust said gear and said wheel to effect changes of feed in cutting speed, substantially as described.

20. In a machine for generating the teeth of bevel-gears, means to carry a bevel-gear, a rotatable grinding-wheel, means to give a series of reciprocatory movements to said wheel in the operation of grinding the gear, and mechanism to adjust said gear and to adjust said grinding-wheel to generate different sizes and angles of bevel-gears, substantially as set forth.

21. In a machine for generating the teeth of bevel-gears, an oscillatory table, means supported upon said table to carry the gear, means carried by said table to actuate the gear, a rotatable grinding-wheel, and means to give to said wheel a series of reciprocatory movements on the cone-line of the gear in the operation of grinding the gear, substantially as set forth.

22. In a machine for generating the teeth of bevel-gears, means to carry a gear, a rotatable grinding-wheel, means to give to said wheel a series of reciprocatory movements in the operation of grinding the gear, and mechanism to automatically actuate said gear and said grinding-wheel, whereby the gear being operated upon by said wheel may have one complete step-by-step revolution, substantially as described.

23. In a machine for generating the teeth of bevel-gears, a rotatable grinding-wheel, means to reciprocate the grinding-wheel in the operation of grinding the gear, a spindle to carry a gear, a spindle-bracket to carry said spindle, and a quadrant, said bracket adjustable on said quadrant, substantially as described.

24. In a machine for generating the teeth of bevel-gears, an oscillatory table, a quadrant having its center in a plane passing through the cone-center of the gear, and means to carry the gear adjustably engaged with said quadrant, substantially as described.

25. In a machine for generating the teeth of bevel-gears, an oscillatory table, a quadrant having its center on a plane passing through the cone-center of the gear, a spindle-bracket, and a spindle carried by said bracket, said bracket adjustably secured to the quadrant at a desired angle to a plane passing through the cone-center of the gear, substantially as described.

26. In a machine for generating the teeth of bevel-gears, means to carry a gear, and a rotatable grinding-wheel reciprocatory on a cone-line of the gear, the means to carry the gear having a rolling movement and an oscillatory movement in operation on a line passing through the cone-center of the gear, substantially as described.

27. In a machine for generating the teeth of bevel-gears, a rotatable spindle to carry a gear, means to give to the spindle a rolling movement about the cone-center, and mechanism to horizontally oscillate said spindle on an axis passing through the cone-center of the gear, substantially as described.

28. In a machine for generating the teeth of bevel-gears, an oscillatory table, means carried thereby to carry a gear, indexing mechanism oscillatory with the table to index the gear, a rotatable grinding-wheel, and means to give to said wheel a series of reciprocatory movements on the cone-line of the gear in the operation of grinding the gear, substantially as described.

29. In a machine for generating the teeth of bevel-gears, a quadrant, oscillatory means to carry a gear adjustable upon said quadrant, a rotatable grinding-wheel, and means to give to said wheel a series of reciprocatory movements on the cone-line of the gear in the operation of grinding the gear, substantially as described.

30. In a machine for generating the teeth of bevel-gears, means for carrying the gear to be cut, said means made vertically and longitudinally oscillatory on a line passing through the cone-center of the gear, a rotatable grinding-wheel, and means to give to said wheel a series of reciprocatory movements on the cone-line of the gear in the operation of grinding the gear, substantially as described.

31. In a machine for generating the teeth of bevel-gears, the combination of a spindle-bracket, a spindle carrying the gear carried by said bracket, and a rotatable grinding-wheel, and means to give to said wheel a series of reciprocatory movements on the cone-line of the gear in the operation of grinding the gear, said bracket made adjustable to any desired angle to a horizontal plane passing through the cone-center of the gear, substantially as set forth.

32. In a machine for generating the teeth of bevel-gears, the combination of a bracket, a spindle mounted therein to carry a gear, and means to raise and lower the end of said bracket opposite the gear to set the gear at a desired angle, substantially as described.

33. In a machine for generating the teeth of bevel-gears, a rotatable grinding-wheel, means to carry a gear, mechanism to reciprocate said grinding-wheel in operation whereby one of its lateral surfaces will be reciprocated on a plane passing through the cone-center of the gear, substantially as described.

34. In a machine for generating the teeth of bevel-gears, a rotatable grinding-wheel, means to give to said wheel a reciprocatory movement in operation whereby one of its grinding-surfaces will be reciprocated on a plane passing through the cone-center of the gear, said wheel having an additional reciprocatory movement to clear the grinding-wheel from the gear, said grinding-wheel made also vertically and laterally adjustable, substantially as set forth.

35. In a machine for generating the teeth of bevel-gears, an oscillatory table to carry the gear to be cut, and a rotatable grinding-wheel having a series of reciprocatory movements on the cone-line of the gear in the operation of grinding the gear, said table centered at the intersection of planes which also intersect the cone-center of the gear, substantially as described.

36. In a machine for generating the teeth of bevel-gears, a base, and an oscillatory table mounted upon said base, said table gibbed at its outer edge by a gib secured upon said base, substantially as described.

37. In a machine for generating the teeth of bevel-gears, an oscillatory table, a quadrant, and a spindle-bracket adjustably engaged with said quadrant, said bracket also fulcrumed to a portion of said quadrant, substantially as described.

38. In a machine for generating the teeth of bevel-gears, an oscillatory table, a spindle to carry a gear mounted upon said table, and a segment to actuate said spindle, said segment provided with an arm fulcrumed on a line passing through the cone-center of the gear, substantially as described.

39. In a machine for generating the teeth of bevel-gears, an oscillatory spindle-bracket, a spindle in said bracket to carry a gear, an arm provided with a segment to drive said spindle, a rotatable grinding-wheel, and means to give to said wheel a series of reciprocatory movements on the cone-line of the gear in the operation of grinding the gear, said arm made oscillatory on a line passing through the cone-center of the gear, substantially as described.

40. In a machine for generating the teeth of bevel-gears, a spindle to carry a gear, a gear upon said spindle, and a segment meshing with said gear to give a rolling movement to said spindle, said segment provided with an arm fulcrumed on a line passing through the cone-center of the gear, substantially as described.

41. In a machine for generating the teeth of bevel-gears, a device to carry a gear, means to give to the gear an oscillatory and a rolling movement about the cone-center of the gear, and a movable inclined slide to govern the ratio of the oscillatory and rolling movements of the gear, substantially as described.

42. In a machine for generating the teeth of bevel-gears, a spindle having an oscillatory movement about the cone-center of the gear to carry a gear, and a rotatable grinding-wheel having a series of reciprocatory movements on the cone-line of the gear in the operation of grinding the gear, an indexing-wheel, and mechanism to actuate said wheel to give a step-by-step movement to said spindle, substantially as described.

43. In a machine for generating the teeth of bevel-gears, a device to carry a gear, means to give to the gear an oscillatory and a rolling movement about the cone-center of the gear, and an oscillatory slide having an endwise movement to govern the ratio of the oscillatory and rolling movements of the gear, substantially as described.

44. In a machine for generating the teeth of bevel-gears, an oscillatory table, a shaft journaled therein, gears upon said shaft, a stationary toothed segment meshing with one of said gears, a rack meshing with the other of said gears, a slide 14 connected with said rack movable in a direction toward and from the center of oscillation of the table, an inclined slotted slide 16 carried by the slide 14 and fulcrumed thereto, means to adjust and to hold the slide 16 at a desired angle to the slide 14, a block having a sliding engagement in the slide 16, a bracket, a vertical rack-slide engaged in said bracket, having a stud swiveled in said block, and a toothed segment meshing with said rack-slide, said segment provided with a fulcrumed arm having its axis on a line passing through the cone-center of the gear, substantially as described.

45. In a machine for generating the teeth of bevel-gears, an oscillatory table, a spindle upon said table to carry a gear, a toothed segment to drive said spindle, said segment provided with an arm fulcrumed on a line passing through the cone-center of the gear, said arm being adjustable, and means to hold said arm in any given position of adjustment, substantially as described.

46. In a machine for generating the teeth of bevel-gears, an oscillatory table, an oscillatory spindle-bracket mounted on said table, a spindle carried thereby to carry a gear, indexing mechanism engaged with said spindle, a shaft 97 to actuate said indexing mechanism provided with a gear 96, a rotatable gear 94, and an intermediate gear meshing with the gears 94 and 96, said intermediate gear having its center on a line passing through the pivoting-point of the spindle-bracket, substantially as described.

47. In a machine for generating the teeth of bevel-gears, an oscillatory table, a spindle to carry a gear, a rotatable grinding-wheel, and means to give to said wheel a series of reciprocatory movements on the cone-line of the gear in the operation of grinding the gear, indexing mechanism carried by said spindle and an index-shaft to actuate said indexing mechanism, and means to actuate said shaft, substantially as set forth.

48. In a machine for generating the teeth of bevel-gears, an oscillatory table, an oscillatory spindle-bracket mounted on said table, a spindle carried thereby to carry a gear, indexing mechanism engaged with said spindle, a shaft 97 to actuate said indexing mechanism provided with a gear 96, a rotatable gear 94, and an intermediate gear meshing with the gears 94 and 96, said intermediate gear having its center on a line passing through the pivoting-point of the spindle-bracket, the shaft of the spindle 94 having its bearing in said table, driving mechanism to actuate the last-named shaft, and an intermediate universal joint, substantially as described.

49. In a machine for generating the teeth of bevel-gears, a spindle to carry a gear, a cam-actuated index-plunger arm upon said spindle, an index-wheel upon said spindle, a spring-actuated index-plunger carried by said arm and engaging the index-wheel, a ratchet-wheel connected with the index-wheel, an index-shaft 97, an index-pawl arm 109 provided with a pawl to engage said ratchet-wheel, means to actuate said arm, and a shield to keep the pawl from engaging the ratchet-wheel when at rest, substantially as set forth.

50. In a machine for generating the teeth of bevel-gears, a rotatable grinding-wheel, a reciprocatory ram to carry said wheel, a ram-adjusting slide to carry said ram and with which said ram is adjustably engaged, and a sliding block to carry the ram-adjusting slide, means to reciprocate the ram-adjusting slide, substantially as described.

51. In a machine for generating the teeth of bevel-gears, a rotatable grinding-wheel, a reciprocatory ram to carry said wheel, a ram-adjusting slide to carry said ram and with which said ram is adjustably engaged, a sliding block to carry the ram-adjusting slide, means to reciprocate the ram-adjusting slide, and means to reciprocate said sliding block, substantially as described.

52. In a machine for generating the teeth of bevel-gears, a rotatable grinding-wheel, a reciprocatory ram to carry said wheel, said ram provided with a vertical sliding bearing at its inner end, a cross-slide block vertically adjustable in said bearing, and a slide in said block provided with bearings for said grinding-wheel, substantially as described.

53. In a machine for generating the teeth of bevel-gears, an oscillatory table, means mounted thereupon to carry a gear to be cut, and mechanism to regulate the movement of said table, substantially as described.

54. In a machine for generating the teeth of bevel-gears, an oscillatory table, means mounted thereupon to carry a gear to be cut, an oscillatory arm 43, a feed-lever 46 connected with said arm, and an arm F to actuate said table, said arm adjustably connected with said feed-lever, substantially as described.

55. In a machine for generating the teeth of bevel-gears, a spindle to carry a gear to be cut, an index-wheel, and a ratchet-wheel to index said spindle, an index-pawl arm, a ratchet carried by said arm, an index-lever connected with said pawl-arm, cams to actuate said index-lever, and a shaft carrying said cam, substantially as described.

56. In a machine for generating the teeth of bevel-gears, a spindle to carry a gear to be cut, an index-wheel, and a ratchet-wheel to index said spindle, an index-plunger arm upon said spindle provided with an index-plunger to engage the index-wheel, and a rotatable cam to actuate said plunger, substantially as described.

57. In a machine for generating the teeth of bevel-gears, an oscillatory table, a spindle to carry a gear to be cut mounted upon said table, a plunger-arm carried with said spindle, and a cam to actuate said arm, said arm carried away from said cam as the table is oscillated, and returned by said table into position to be acted upon by said cam, substantially as described.

58. In a machine for generating the teeth of bevel-gears, a grinding-wheel, a spindle carrying said wheel, devices for carrying the spindle, caps hinged to said devices, and means to engage said caps upon said devices, said caps being removable, substantially as described.

59. In a machine for generating the teeth of bevel-gears, a grinding-wheel, a spindle to carry said wheel, a cross-slide provided with spherical bearing-boxes to carry the spindle, and caps hinged to said slide, whereby said bearing-boxes with said spindle may be removed from said slide, substantially as described.

60. In a machine for generating the teeth of bevel-gears, the combination of means to carry a gear to be cut, and means to give to the grinding-wheel a series of reciprocatory movements in the operation of grinding the gear, the cutting-face of said wheel being at an angle to a plane normally at right angles to the axis of the wheel, said angle equal to the angle of obliquity of the gear to be generated, substantially as described.

61. In a machine for generating the teeth of bevel-gears, a rotatable grinding-wheel, and an adjustable ram to carry said wheel, and means to give to the grinding-wheel a series of reciprocatory movements in the operation of grinding the gear, substantially as described.

62. In a machine for generating the teeth of bevel-gears, a rotatable grinding-wheel, an adjustable ram having a series of reciprocatory movements to carry said grinding-wheel and to reciprocate the wheel in the operation of grinding the gear, said ram having an additional reciprocatory movement to clear the grinding-wheel from the gear, substantially as set forth.

63. In a machine for generating the teeth of bevel-gears, a rotatable grinding-wheel, a ram to carry said wheel having a series of reciprocatory movements, an eccentric to reciprocate the ram and give to the grinding-wheel a series of reciprocatory movements in the operation of grinding the gear, and a rotatable shaft geared with said eccentric, the bearing for the eccentric being also reciprocatory, substantially as described.

64. In a machine for generating the teeth of bevel-gears, the combination of a rotatable grinding-wheel, a ram, an eccentric to reciprocate the ram, a reciprocatory slide carrying the eccentric to give to the grinding-wheel a series of reciprocatory movements in the operation of grinding the gear, a shaft geared with said eccentric, and means to reciprocate said slide, substantially as set forth.

65. In a machine for generating the teeth of bevel-gears, the combination of a spindle to carry a gear to be cut, an index-wheel upon said spindle, a rotatable shaft to move the index-wheel one step at every complete revolution of said shaft, and a rotatable grinding-wheel having a series of reciprocatory movements on the cone-line of the gear in the operation of grinding the gear, substantially as set forth.

66. In a machine for generating the teeth of bevel-gears, a spindle to carry a gear, an oscillatory spindle-bracket carrying said spindle, an index-wheel to actuate said spindle, and a rotatable shaft carried by said bracket to move the index-wheel one step at each complete revolution of said shaft, substantially as described.

67. In a machine for generating the teeth of bevel-gears, the combination of a spindle-bracket, a spindle mounted in said bracket to carry a gear to be generated, an index-wheel upon said spindle, a rotatable shaft to actuate the index-wheel, said shaft carried by said bracket, gear to actuate said shaft, and means to permit the adjustment of said shaft, substantially as set forth.

In testimony whereof I sign this specification in the presence of two witnesses.

HERBERT W. CHENEY.

Witnesses:
N. S. WRIGHT,
MARY HICKEY.